United States Patent
Sreeramoju et al.

(10) Patent No.: US 9,479,348 B2
(45) Date of Patent: Oct. 25, 2016

(54) TECHNIQUE TO SUBMIT MULTICAST MEMBERSHIP STATE IN ABSENCE OF QUERIER

(71) Applicant: VMware, Inc., Palo Alto, CA (US)

(72) Inventors: Akshay Kumar Sreeramoju, San Jose, CA (US); Alexander Tessmer, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 144 days.

(21) Appl. No.: 14/561,886

(22) Filed: Dec. 5, 2014

(65) Prior Publication Data

US 2016/0094353 A1    Mar. 31, 2016

Related U.S. Application Data

(60) Provisional application No. 62/057,975, filed on Sep. 30, 2014.

(51) Int. Cl.
*H04L 12/26* (2006.01)
*H04L 12/18* (2006.01)

(52) U.S. Cl.
CPC ......... *H04L 12/185* (2013.01); *H04L 12/1863* (2013.01)

(58) Field of Classification Search
CPC .................. H04L 12/185; H04L 12/1863
See application file for complete search history.

(56) References Cited

U.S. PATENT DOCUMENTS

| | | | | |
|---|---|---|---|---|
| 6,370,142 B1* | 4/2002 | Pitcher | ................ | H04L 12/5601 370/390 |
| 6,826,612 B1* | 11/2004 | Bosloy | ................ | H04L 12/1863 709/226 |
| 8,301,137 B1* | 10/2012 | Farley | ................ | H04W 4/08 455/434 |
| 8,817,784 B2* | 8/2014 | Riddoch | ................ | 370/389 |
| 2007/0183418 A1* | 8/2007 | Riddoch | ................ | H04L 49/90 370/389 |
| 2009/0147789 A1* | 6/2009 | Ng | ................ | H04L 29/12216 370/392 |
| 2009/0213855 A1* | 8/2009 | Xu | ................ | H04L 12/185 370/390 |
| 2010/0014519 A1* | 1/2010 | Fernandez Gutierrez | ................ | H04L 12/185 370/390 |
| 2011/0213868 A1* | 9/2011 | Chen | ................ | H04L 12/185 709/223 |
| 2013/0272133 A1* | 10/2013 | Yalagandula | ................ | H04L 45/16 370/238 |
| 2013/0308636 A1* | 11/2013 | Bacthu | ................ | H04L 12/185 370/390 |
| 2014/0098713 A1* | 4/2014 | Beckhardt | ................ | H04N 21/42684 370/256 |
| 2014/0233563 A1* | 8/2014 | Chen | ................ | H04L 12/18 370/390 |
| 2014/0301382 A1* | 10/2014 | Banerjea | ................ | H04L 12/1877 370/338 |
| 2015/0049761 A1* | 2/2015 | Kumagai | ................ | H04L 12/1863 370/390 |
| 2016/0043878 A1* | 2/2016 | Hao | ................ | H04L 12/185 370/390 |

* cited by examiner

*Primary Examiner* — Jay P Patel
(74) *Attorney, Agent, or Firm* — Barta, Jones & Foley, P.C.

(57) ABSTRACT

A method of submitting multicast membership packets by a host in a multicast domain in absence of a querier to trigger those packets is provided. The host includes a silent state and an active state. In the silent state, the host receives membership query packets from a querier and responds by sending multicast report packets to multicast group addresses that the host is joined. When a membership query packet is not received during a configurable period of time, the host changes from the silent state to active state and starts sending unsolicited multicast report packets to the multicast addresses that the host has joined.

21 Claims, 11 Drawing Sheets

Port 1 Multicast Group Table

| Multicast Group Addresses | Expiration Time |
|---|---|
| G1 | .2 |
| G3 | 12 |
| ... | ... |

Port 2 Multicast Group Table

| Multicast Group Addresses | Expiration Time |
|---|---|
| G2 | 3.5 |
| G3 | 22 |
| G7 | 1.5 |
| ... | ... |

*Fig. 6*

TECHNIQUE TO SUBMIT MULTICAST MEMBERSHIP STATE IN ABSENCE OF QUERIER

This application claims the benefit of U.S. Provisional Patent Application 62/057,975, filed Sep. 30, 2014. U.S. Application 62/057,975 is incorporated herein by reference.

BACKGROUND

The Internet group management protocol (IGMP) is used by network hosts to report their multicast group memberships to any neighboring multicast routers. A typical Internet Protocol (IP) over Ethernet multicast domain uses IGMP for multicast enabled switches to build multicast group tables on each of their ports. Within a multicast domain, hosts send multicast packets to join or leave multicast groups. Within a multicast domain, a multicast querier (i.e., a device that sends queries) is elected to periodically broadcast a membership query packet to all hosts in the network at configured time intervals. Upon receiving a membership query packet, hosts respond with one or more multicast report packets to Multicast Group Addresses (MGAs) if using IGMP, Version 2 (IGMPV2) or to Multicast Routers Group Address (MRGA) if using IGMP, Version 3 (IGMPV3).

In IGMPV2, hosts send two types of IGMP messages, report and leave. A host joins a group by sending a report to an MGA. The host responds to a query by sending a report to that MGA. The host leaves the group by sending a leave packet to the MGA. In IGMPV3, hosts send only one type of IGMP message, IGMP report. A host responds to a query, joins a group, or leaves a group by sending reports to an MRGA and setting different fields in the report.

Multicast enabled switches snoop/read multicast packets received on their ports. Upon receiving a multicast packet that includes a request to join an MGA (or MRGA, depending on the IGMP version used), a multicast enabled switch adds the corresponding MGA (or MRGA) with expiry time to the receiving port's multicast group table. Upon receiving a subsequent multicast report packet, a multicast enabled switch refreshes expiry time of the corresponding MGA (or MRGA) in the receiving port's multicast group table. Upon receiving a multicast packet requesting to leave an MGA (or MRGA), a multicast enabled switch removes the corresponding group's address in the receiving port's multicast group table. When a multicast enabled switch receives a multicast packet, the switch forwards the packet only out of those ports whose multicast group table contains the destination address of the multicast group. Typically an Open Systems Interconnection (OSI) model Layer 3 (L3) device, router, or dedicated host performs querier role and an OSI Layer 2 (L2) device or switch performs snooper role.

Therefore, the multicast packets requesting to join create MGAs (or MRGAs) in multicast group tables. Multicast report packets, which are driven by membership query packets, sustain the group addresses in multicast group tables. Expired timers remove MGAs (or MRGAs) from multicast group tables. In the absence of a querier, for instance if no querier is enabled or there is no device with querying capability, membership query packets are not generated. So multicast report packets are not triggered. Therefore MGAs (or MRGAs) in multicast group table expire before a host leaves the group. This means hosts may not receive multicast traffic destined to joined multicast groups even though the host has not left the groups yet.

BRIEF SUMMARY

Some embodiments provide a method of submitting multicast membership packets by a host in a multicast domain in absence of a querier to trigger those packets. A host in these embodiments includes two states: silent state and active state. In silent state, the host receives membership query packets from a querier through a multicast snooping switch and responds by sending multicast report packets to multicast group addresses that the host is joined. The snooping switch maintains a multicast group table to keep track of memberships to multicast group addresses. The snooping switch assigns a timeout to each multicast group address in the table and keeps on setting the timeouts back to a configurable maximum as long as the switch snoops a multicast report packet sent to the multicast group address during the timeout period.

When a membership query packet is not received during a configurable period of time, the host changes from the silent state to active state and starts sending unsolicited multicast report packets to the multicast addresses that the host has joined. The snooping switch uses the multicast report packets to set back the timeout values of the multicast group addresses back to maximum. As a result the host keeps on receiving multicast packets sent to multicast groups that the host have joined until the host sends a multicast leave packet to leave a multicast group.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing.

BRIEF DESCRIPTION OF THE DRAWINGS

The novel features of the invention are set forth in the appended claims. However, for purposes of explanation, several embodiments of the invention are set forth in the following figures.

FIG. 6 conceptually illustrates multicast group tables that the L2 switch in FIG. 5 maintains in some embodiments of the invention.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

I. Mechanisms for Maintaining Multicast Group Memberships

The Internet group management protocol (IGMP) is an OSI L3 protocol that is used to establish multicast group memberships. Within a multicast domain, hosts send multicast join packets when they join a multicast group and multicast leave packets when they leave the multicast group. An OSI L3 device (L3 device) such as an OSI L3 level router (L3 router) in the multicast domain keeps track of the multicast groups that the hosts have joined and sends multicast packets addressed to each particular multicast group only through the egress ports that are connected to at least one host that has joined the particular multicast group. A host in a network is a device (such as a computing device) that is connected to the network and provides data, applications, and other services to users or other nodes on the network. Network devices such as switches, routers, or modems are typically not considered as hosts.

A. Hosts Joining or Leaving Multicast Groups

Figure 1:
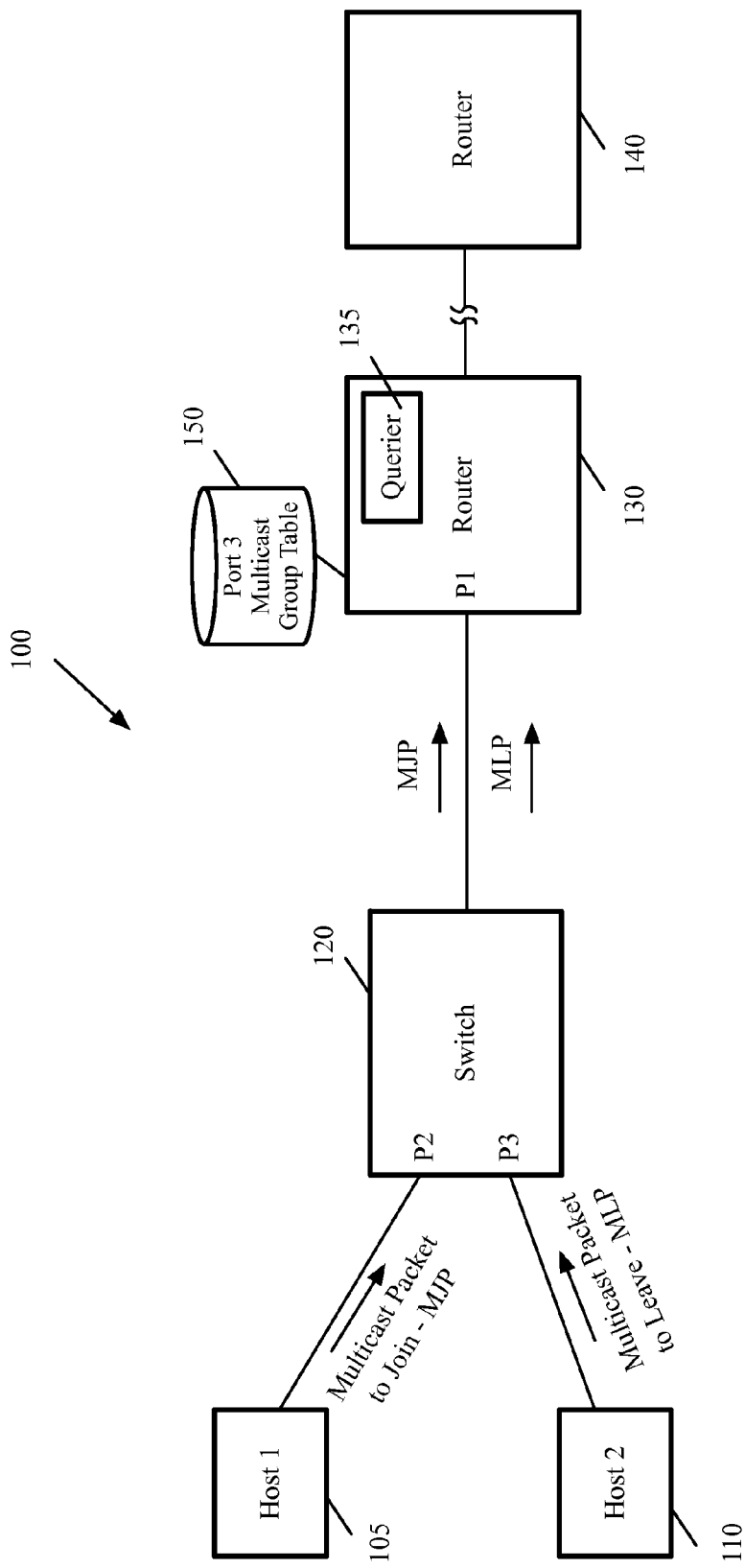
FIG. 1 conceptually illustrates a network that supports multicast communication in some embodiments of the invention.

FIG. 1 conceptually illustrates a network 100 that supports multicast communication in some embodiments of the invention. As shown, the network includes several hosts 105-110 that are connected to a switching device 120. The hosts are physical computing devices. In some embodiments, the hosts are used in a software defined datacenter to host one or more virtual machines (not shown). Virtual machines (VMs) are software implementation of a machine such as a computer. A VM is typically an emulation of a system that is created and run within another system. In some embodiments, the switching device 120 is a switch that operates at OSI L2 protocol level (L2 switch). The switch is connected to an L3 device 130 such as an L3 router. The L3 device 130 is connected to other L3 devices in the network such as router 140. The L3 device 130 can connect to several L2 switches through the device's different ports (only one port (P1) and one switch 120 are shown for simplicity). Each host 105-110 can also have multiple interfaces, with each interface connected to an L2 switch. For simplicity, only one interface of each host is shown in FIG. 1.

As shown, host 105 sends a multicast packet to join a multicast group address to the router 130 informing the router 130 that the host wants to receive all multicast packets addressed to the identified multicast group address. To simplify discussions, this Specification uses to the term multicast group address (or group address) to refer to a Multicast Group Address (MGA) or a Multicast Routers Group Address (MRGA), depending on the version of the IGMP used. Router 130 maintains a multicast group table 150 (or list) for each of its ports. In this example, router 130 adds the identified multicast group address to the multicast group table associated with port P1. Using the multicast group table allows the router to maintain a map of which links need a multicast packet. The router can filter out multicast packets from the links that do not need them (i.e., the router does not send a multicast packet addressed to a particular multicast group address out of a port if none of the hosts connected to the port has joined the particular multicast group address).

Figure 2:
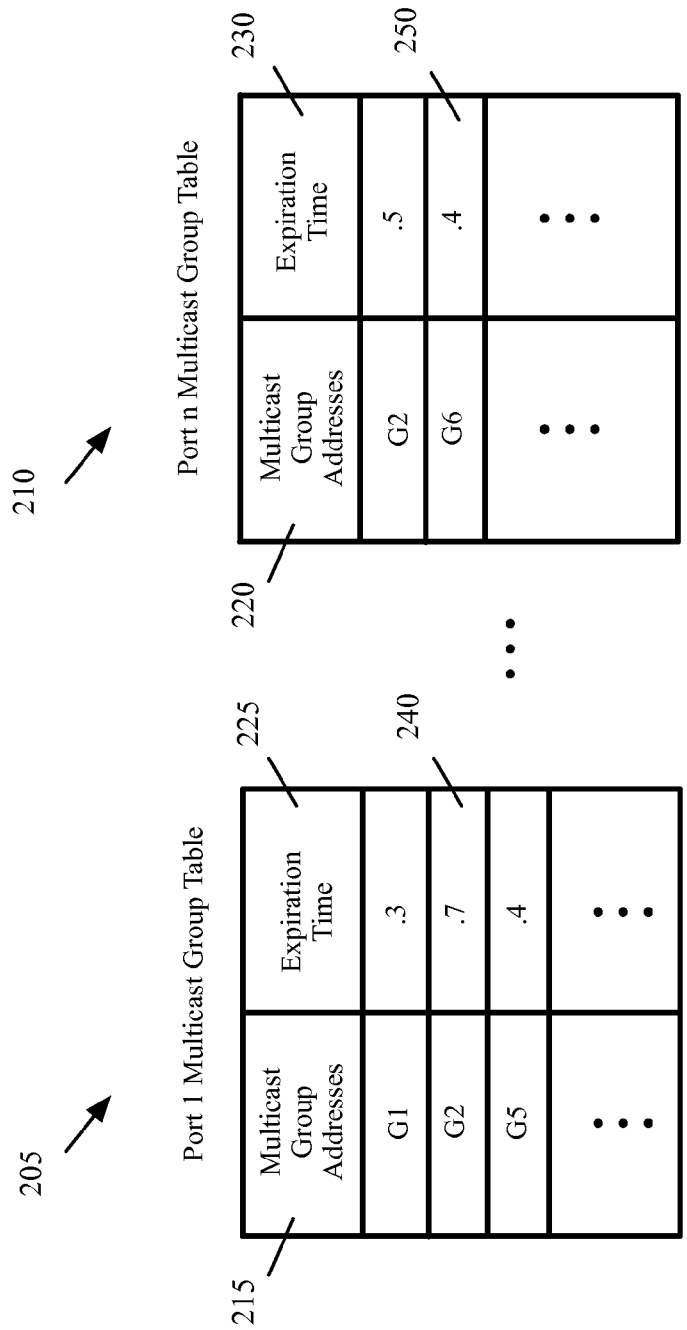
FIG. 2 conceptually illustrates multicast group tables that an L3 device such as a router maintains in some embodiments of the invention.

FIG. 2 conceptually illustrates multicast group tables 205-210 that an L3 device such as router 130 maintains in some embodiments of the invention. The L3 devices in some embodiments maintain one table for each of the L3 device's ports. As shown, the L3 device in this example includes n ports 1-$n$ and maintains n multicast group tables 205-210. Each table is maintained for one of the L3 device's ports and lists the multicast group addresses 215-220 that at least one of the hosts connected to the port has joined.

For instance, the multicast group addresses 215 in table 205 specify that the hosts that are connected (through one or more switches) to port 1 have joined multicast groups with addresses G1, G2, and G5. Similarly, the multicast group addresses 220 in table 210 specify that the hosts that are connected (through one or more switches) to port n have joined multicast group with addresses G2 and G6. Once an entry is added to a table, an expiration time for the entry is also included in the table (or alternatively is maintained as a count down timer outside the table). The example of FIG. 2 shows that 0.3 time units (e.g., 0.3 seconds) remain before the membership for multicast group address G1 in table 205 expires. As described further below, different embodiments provide different mechanisms to prevent the membership for a multicast group to expire as long as at least one host connected to a port continues to send multicast report packets that are addressed to the multicast group to the L3 device.

As shown in FIG. 1, host 110 sends a multicast packet to leave a multicast group address that the host had previously joined informing the router 130 that the host does not want to receive all multicast packets addressed to the identified multicast group address. For instance, in IGMPV2 the host sends a leave packet and in IGMPV3 the host sends a report packet requesting to leave a multicast group address. For simplicity, this Specification uses the term sending a leave packet (a leave message or a leave request) to refer to the corresponding mechanism for leaving a multicast group address depending on the IGMP version used. In this example, router 130 removes the identified multicast group address from the multicast group table associated with port P1 if there are no other hosts that are connected (through L2 switches) to port P1 remain member of the identified multicast group. When a querier/snooper device receives a leave packet from a host to leave a group address, the querier/snooper device sends queries for the specific group address into the network. The hosts that are still member of the group address respond to the query and the group address is not removed from the group address table as long as at least one other host remains a member of the group address.

In order to prevent the timeouts for each multicast group table entry to expire, a querier is included in the multicast domain. In the example of FIG. 1, the router 130 includes a multicast querier 135 that broadcasts membership query packets (MQPs) to L2 switches that are connected to the router 130. In other embodiments, the querier can be a separate device. A membership query packet can be a general membership query to inquire membership in any multicast group address or the query can be a group-specific query inquiring about membership in a particular multicast group address. A host responds to general membership queries by identifying all multicast groups addresses that the host has joined. A host responds to a group-specific membership query if the host has joined the particular multicast group address.

Figure 3:
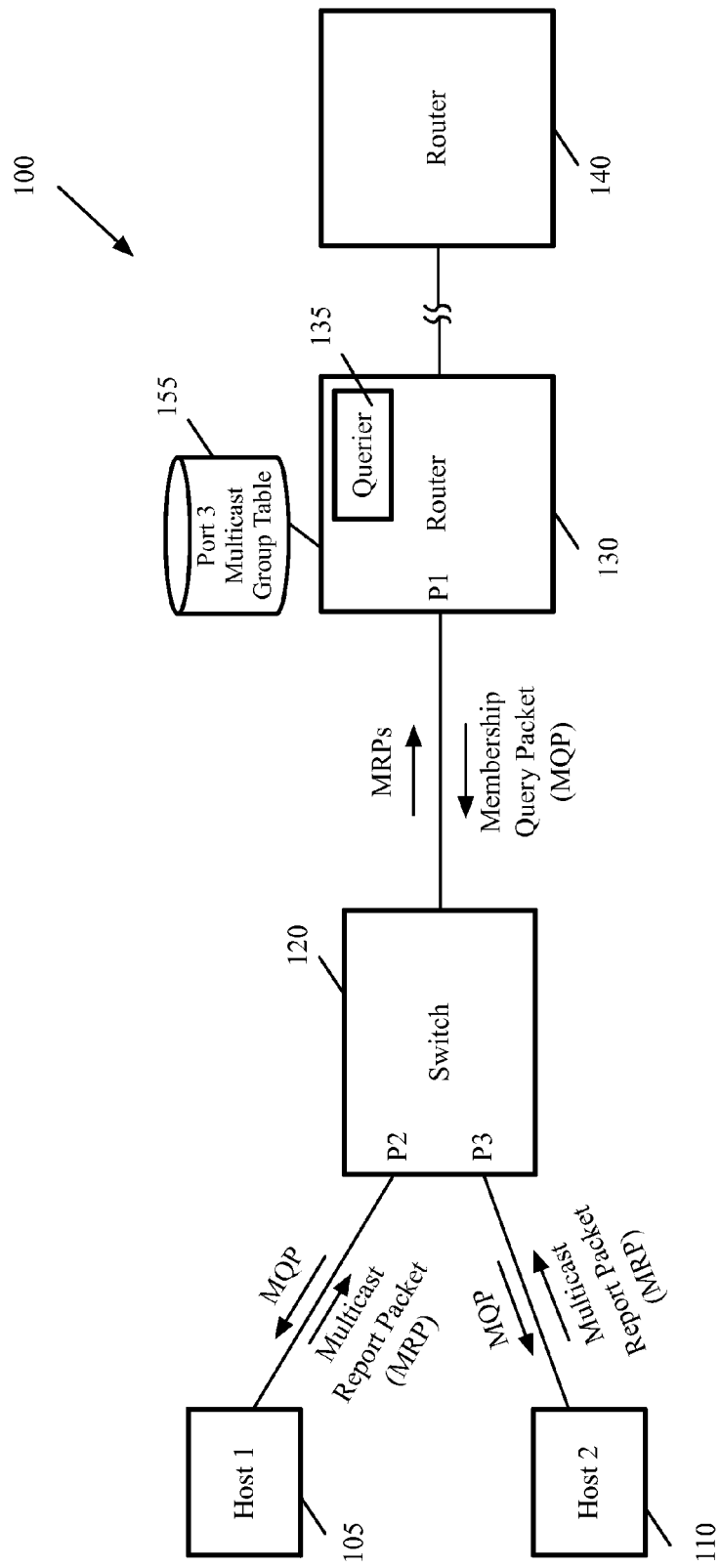
FIG. 3 shows the network of FIG. 1 where the querier periodically sends membership query packets (MQPs) and the hosts respond with multicast report packets (MRPs).

FIG. 3 shows the network 100 of FIG. 1 where the querier periodically sends membership query packets (MQPs) and the hosts respond with multicast report packets (MRPs). As shown in FIG. 3, the querier 135 periodically sends membership query packets out of each egress port such as port P3. L2 switch 120 receives the packets and forwards them to the hosts 105-110 that are connected to each of the switch's ports. If a host is member of one or more multicast groups, the host responds with one or more multicast report packets that are addressed to the multicast group addresses that the host has already joined or wants to join.

The L2 switches (only one shown in FIG. 3) forward the MRPs to router 130 ports. When router 130 receives an MRP addressed to a multicast group address at a port, the router set the expiration time of the multicast group address in the port's multicast group table back to a maximum value. For instance, in the example of FIG. 2, when the router receives an MRP addressed to multicast group address G2 on port 1, the expiration time 240 associated G2 is set to a predetermined/configurable maximum value (e.g., 120 seconds). On the other hand, if the router does not receive an MRP addressed to multicast group address G2 on port n, the expiration time 250 associated G2 eventually runs to 0 and the router removes G2 from port n multicast group table 210. The router does not send any multicast packet addressed to G2 from port n until another host connected to port n joins G2 group.

Figure 4:
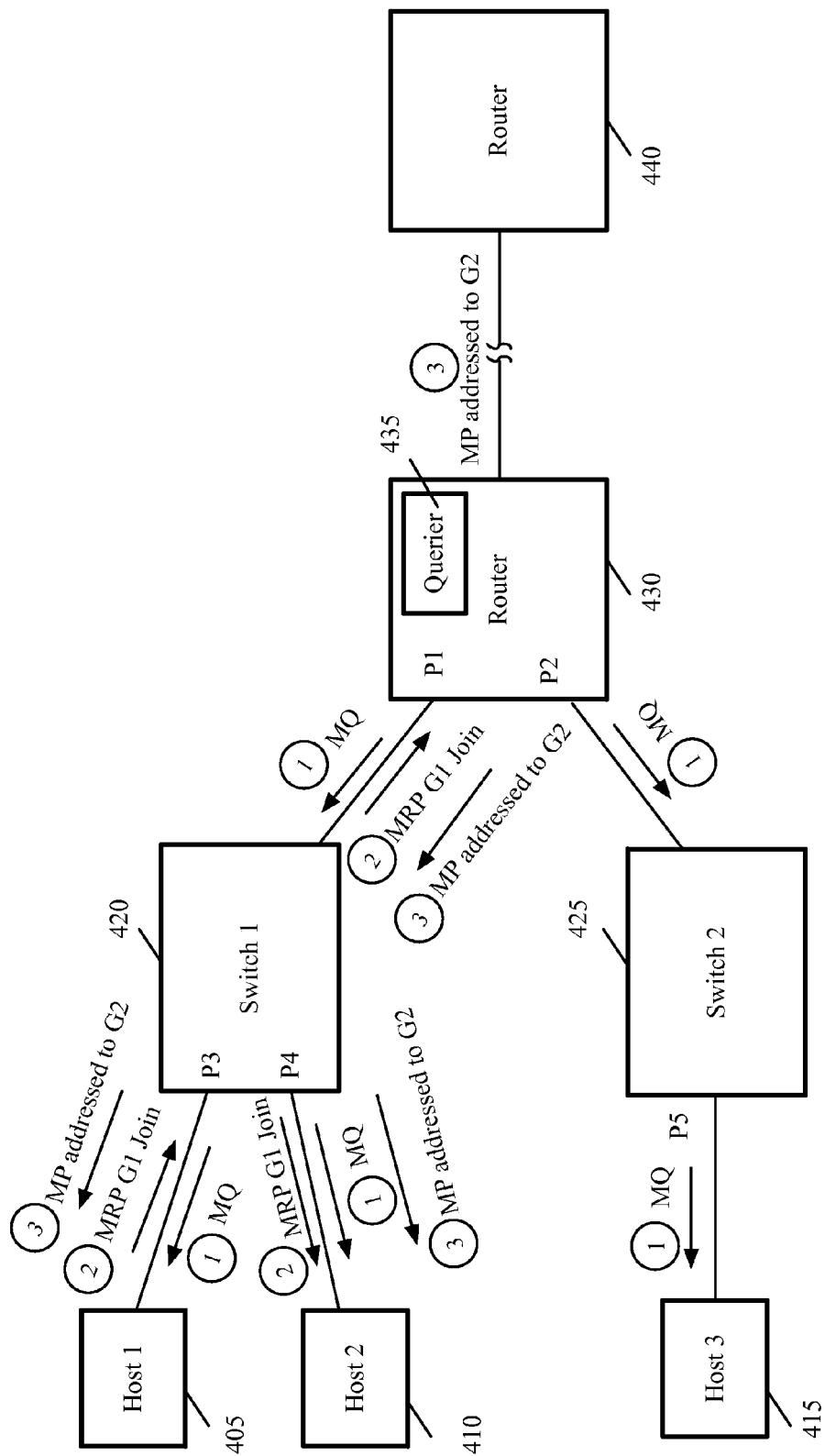
FIG. 4 illustrates a prior art network in which L2 switches forward multicast packets to all ports regardless of hosts' membership in multicast groups.

One problem with the networks in FIGS. 1 and 3 is that the L2 switches broadcast packets to all ports on the network, even to the ports that are not connected to any host that has joined the multicast group in a multicast packet. FIG. 4 illustrates a prior art network in which L2 switches forward multicast packets to all ports regardless of hosts' membership in multicast groups. The sequence of events is labeled by numbers in the circle.

As shown by circles labeled 1, querier 435 in router 430 sends membership queries out of its ports P1 and P2. Switches 420 and 425 sent the queries from their ports P3-P5 to hosts 405-415.

In response to the query, host 405 sends (as shown by circle labeled 2) a multicast report to group G1 address indicating that host 405 is either already a member of G1 multicast group or has just decided to join. The L2 switch 420 sends the multicast report received from host 405 out of all its ports including port P4. As a result, host 410 also receives the multicast report from host 405. Since host 4010 is not interested in the report, the host has to process and ignore the report.

In the example of FIG. 4, host 415 is has not joined any multicast group. Host 415, therefore, ignore the membership query. At a later time, router 430 receives a multicast packet (as shown by circle labeled 3) addressed to G1 multicast address from router 440. Since router 430 has receives report to join G1 only from its port P1, router 430 sends the multicast packet only through its port P1.

Switch L2, however, sends the multicast packet out of all its ports including port P4 where there is no host that is member of G1 multicast group. Host 410, therefore, has to process the extraneous multicast packet and ignore it.

Figure 5:
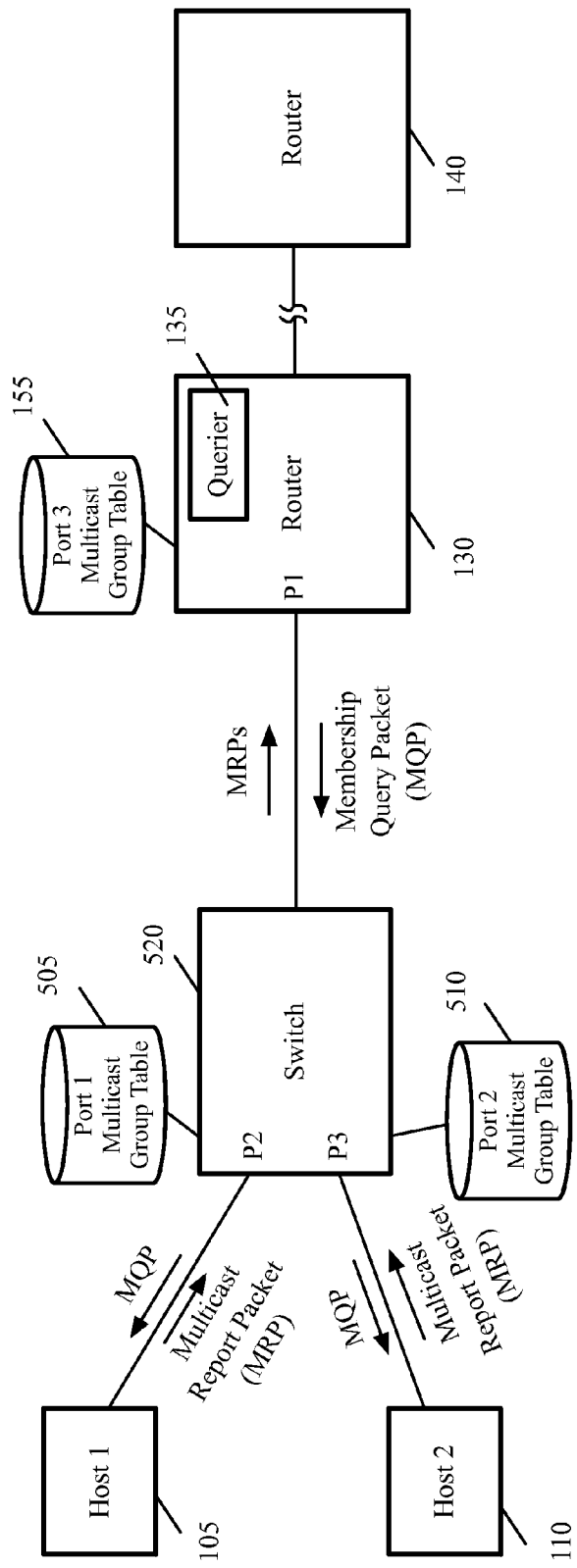
FIG. 5 illustrates a system where the L2 switch snoops the multicast traffic and reads the multicast report, multicast join, and multicast leave packets to find out the hosts that have joined and leaved multicast groups.

In order to eliminate the problem of sending extraneous multicast packets, some L2 switches listen to multicast traffic and create a multicast group table (or list) for each of their ports in order to avoid sending multicast packets to a host that has not joined the multicast group. FIG. 5 illustrates a system similar to the systems in FIGS. 1 and 3 where the L2 switch 520 snoops the multicast traffic and reads the multicast report, multicast join, and multicast leave packets to find out the hosts that have joined and leaved multicast groups. Using the multicast group table allows the switch to maintain a map of the links to the needed multicast group addresses. The switch can filter out multicast packets from the links that do not need them (i.e., the switch does not send a multicast packet addressed to a particular multicast group address out of a port if none of the hosts connected to the port has joined the particular multicast group address).

As shown, the L2 switch 520 maintains multicast group tables 505-510 for each of its ports P1-P2. Each one of the tables 505-510 maintains similar information as tables 205-210 maintained by the router.

The L2 devices in some embodiments maintain one table for each of the L2 device's ports. As shown, the L2 device in this example includes 2 ports P1 and P2. FIG. 6 conceptually illustrates multicast group tables 605-610 that L2 switch 505 in FIG. 5 maintains in some embodiments of the invention. The L2 device maintains 2 multicast group tables 605-610. Each table is maintained for one of the L2 device's ports and lists the multicast group addresses 615-620 that the host connected to the port has joined.

A snooping switch can handle multiple hosts that are members of the same multicast group address and are connected to the same snooping port via an intermediate non-snooping device. An intermediate non-snooping device broadcasts any received multicast packet through all its ports. The hosts that are members of a group address and have not reported their memberships in response to a query suppress their reports for that group address upon receiving the report from the first host. The hosts that have suppressed multicast group address report also do not generate leave messages for that group address when they leave the group (because they have seen a report from another host that wants to remain a member and wants to receive packets addressed to that group address from the same port of the snooping device). When a host connected to a port of a snooping device generates a message to leave a specific group address (e.g., when the host is the first host that is responding to a query), the snooping switch generates a query for the specific group address on that port. The snooping device does not remove the group address from the group address table of that port as long as a host that is still a member of the group responds to the query.

For instance, the multicast group addresses 615 in table 605 specify that the host that is connected to port 1 has joined multicast groups with addresses G1 and G3. Similarly, the multicast group addresses 620 in table 610 specify that the host that is connected to port 2 has joined multicast group with addresses G2, G3, and G6. Once an entry is added to a table, an expiration time for the entry is also included in the table (or alternatively is maintained as a count down timer outside the table). The example of FIG. 6 shows that 0.2 time units (e.g., 0.2 seconds) remain before the membership for multicast group address G1 in table 605 expires.

Figure 7:
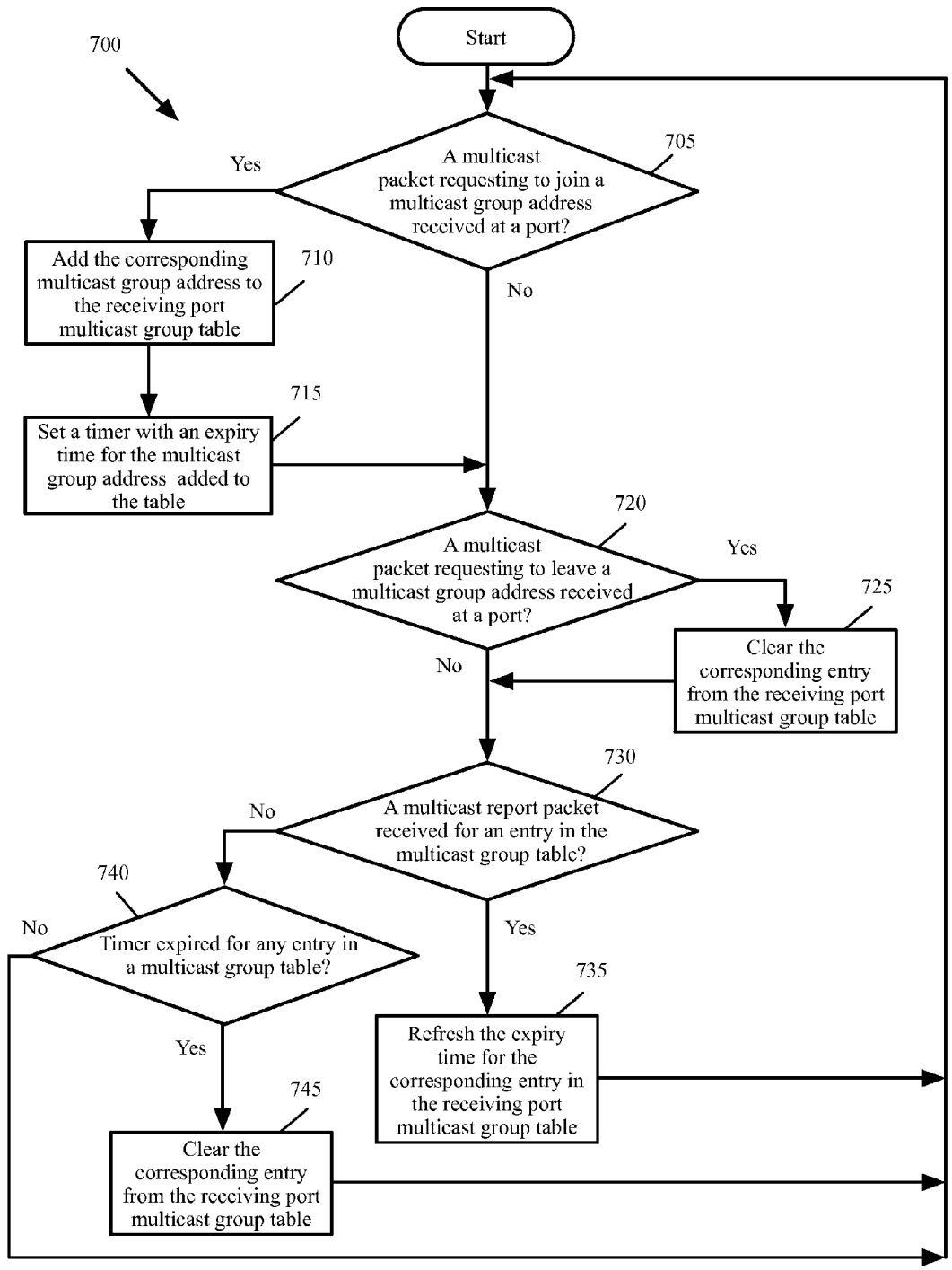
FIG. 7 conceptually illustrates a process performed by a snooping switch to maintain multicast group tables in some embodiments of the invention.

FIG. 7 conceptually illustrates a process 700 performed by a snooping switch to maintain multicast group tables in some embodiments of the invention. As shown, the process determines (at 705) whether a multicast packet requesting to join was received at one of the switch's ports. If not, the process proceeds to 720, which is described below.

Otherwise, the process adds (at 710) the multicast group address included in the multicast join packet to the receiving port's multicast group table. The process also sets (at 715) a timer with an expiry time for the added multicast group address.

The process then determines (at 720) whether a multicast packet requesting to leave a multicast group address is received at one of the switch's ports. If not, the process proceeds to 730, which is described below. Otherwise, the process clears (at 725) the multicast group address from the receiving port multicast group table.

The process then determines (at 730) whether a multicast report packet is received (at one of the switch's ports) that is addressed to a multicast group address that is already stored in multicast group table corresponding to the port. If not, the process proceeds to 740, which is described below. Otherwise, when a multicast report packet is received, the process refreshes (at 735) the expiry time of the corresponding entry in the receiving port's multicast group table. The process then proceeds (e.g., after a predetermined delay) to 705, which was described above.

The process determines (at 740) whether a timer has expired for any entry in a multicast group table. If not, the process proceeds (e.g., after a predetermined delay) to 705, which was described above. Otherwise, the process clears (at 745) the corresponding entry from the receiving port's multicast group table. The process then proceeds (e.g., after a predetermined delay) to 705, which was described above.

B. Preventing Multicast Group Memberships from Expiring in Absence of a Querier

IGMP snooping devices, such as L2 switches, listen to IGMP traffic and maintain multicast group tables for each port that is connected to a host. In the absence of a querier, for example, when no querier is enabled or there is no device with querying capability in the multicast domain, the membership queries are not generated. As a result, the multicast reports are not triggered. Therefore, multicast group addresses in multicast group tables expire due to timer expirations before a host leaves a group. After the expiration of a multicast address, the snooping switch removes the multicast address from the multicast table and the hosts do not receive multicast traffic destined to joined multicast group addresses even though the host has not left the multicast group address yet.

The above problem can be overcome with a solution local to hosts by introducing a new IGMP mode (e.g., IGMPRejoin mode) that is maintained at each interface of the host. When this mode is enabled, the interface would be in one of two states: silent state and active state.

In the silent state, the interface has seen at least one multicast query packet during the past configured/discovered multicast query interval. In some embodiments (e.g., embodiments using IGMPV3) query packets include a field that specifies the query interval (i.e., the interval that the querier sends queries). Hosts can discover (i.e., read/derive) the query interval from a received query. In other embodiments, the query interval is pre-configured. In these embodiments, the hosts derive the query interval from the pre-configured query interval.

In the silent state, all multicast report packets are sent in response to received multicast query packets. In the active state, the interface has not seen any membership query packets in the last multicast query interval. In this state the host generates, at a rejoin interval (which is the same or shorter than the multicast query interval), multicast report packets for all multicast groups the host has joined on that interface. Therefore, no multicast query packets are needed in this state. The active state overcomes the dependency of multicast report packets on membership query packets and thus allows the multicast enabled switches to continue serving joined multicast traffic until the hosts send a multicast leave packets.

Figure 8:
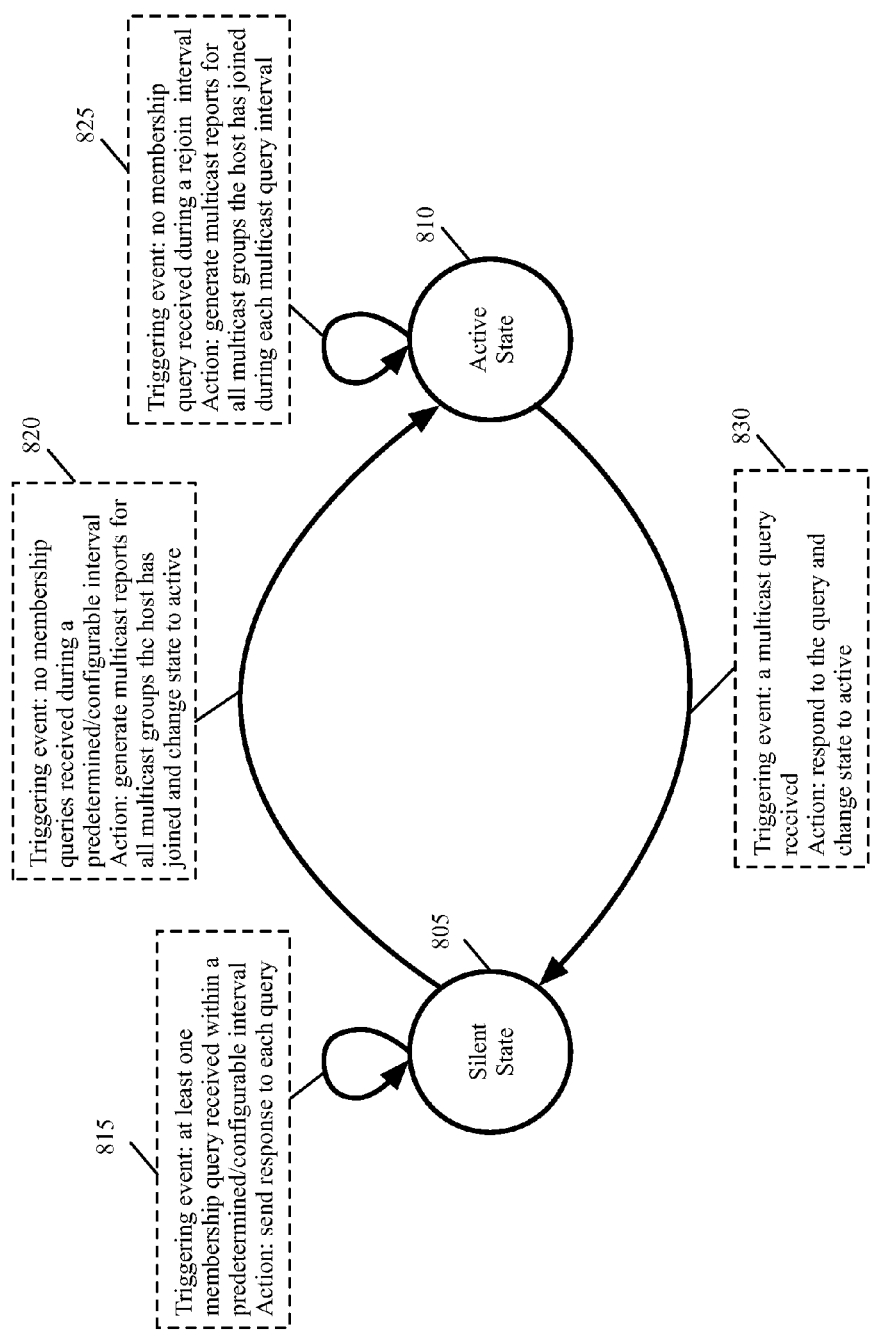
FIG. 8 illustrates a state diagram that a host maintains at each interface to prevent multicast group addresses in multicast group table maintained by a switch to expire.

FIG. 8 illustrates a state diagram that a host maintains at each interface to prevent multicast group addresses in multicast group table maintained by a switch to expire. As shown, the host stays (as shown by 815) in the silent state 805 as long as at least one membership query packet is received within a predetermined/configurable time interval. The action taken by the host is sending multicast report packets in response to the membership query packets. The predetermined/configurable period depends on the time out period after which the snooping device removes a group address from a port's group address table. This period can be equal or smaller than the timeout period. The host stays (as shown by 825) in active state as long as no multicast queries are received. The host continues generating multicast reports at a rejoin interval (which is the same or shorter than the multicast query interval), without being triggered by membership query packets. During each rejoin interval, the host generates multicast report packets for all multicast groups that the host has joined.

Figure 9:
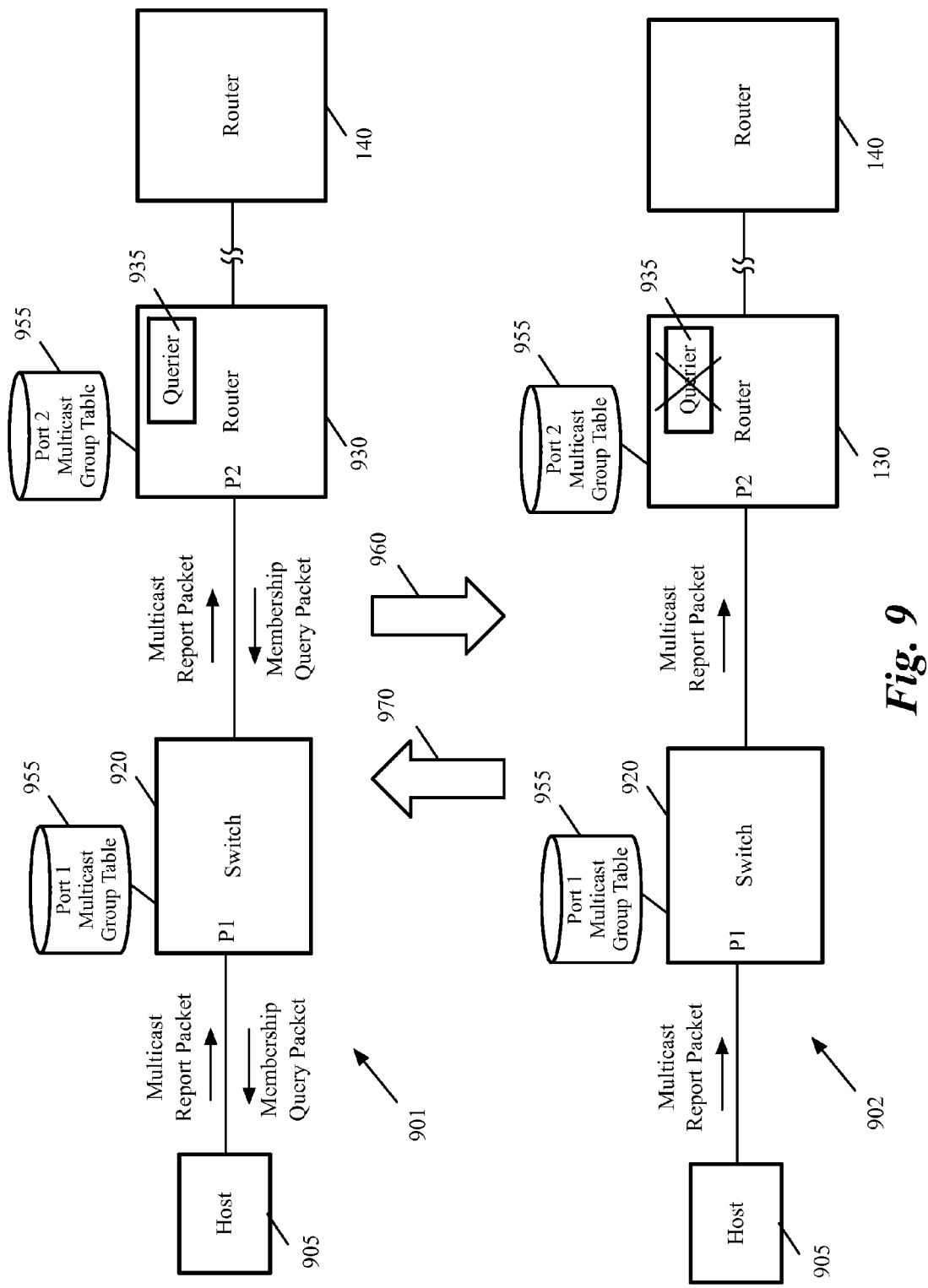
FIG. 9 conceptually illustrates a multicast domain where a host switches between silent and active modes in some embodiments of the invention.

FIG. 9 conceptually illustrates a multicast domain where a host switches between silent and active modes in some embodiments of the invention. The figure shows the multicast domain in two stages 901 and 902. In stage 901, the host 905 receives membership packets from the querier 935 through the router 930 and switch 920. The host is in silent state as described by reference to FIG. 8 above. As shown, in this state, the host responds to the membership query packets by sending multicast report packets to multicast group addresses that the host has joined on the interface. During stage 901, the router 930 and the switch 920 maintain the host's multicast group memberships in their respective multicast group tables using the multicast report packets that are triggered by the membership query packets.

Referring back to FIG. 8, when no membership queries are received during the predetermined/configurable period, the host generates multicast reports for all multicast groups the host has joined and changes (as shown by 820) the state from silent to active.

As shown by arrow 960 in FIG. 9, in stage 902, host 905 has not received any membership query packets during predetermined/configurable. For instance, the querier 935 may have been disabled. The host has changed from silent state to active state and is sending multicast report packets to the switch without being triggered by any membership query packets. During stage 902, router 930 and the switch 920 maintain the host's multicast group memberships in their respective multicast group tables using the multicast report packets that are sent by the host without being triggered by the membership query packets.

Referring back to FIG. 8, when the host receives a membership query packet at the interface, the host changes (as shown by 830) from active state to silent state. The host also responds to the received membership query packet by sending multicast report packets to all multicast group addresses that the host has joined on the interface. As shown by arrow 970 in FIG. 9, the multicast domain is back in stage 901 in which the host is in silent state and sends multicast membership packets only in response to membership query packets.

Figure 10:
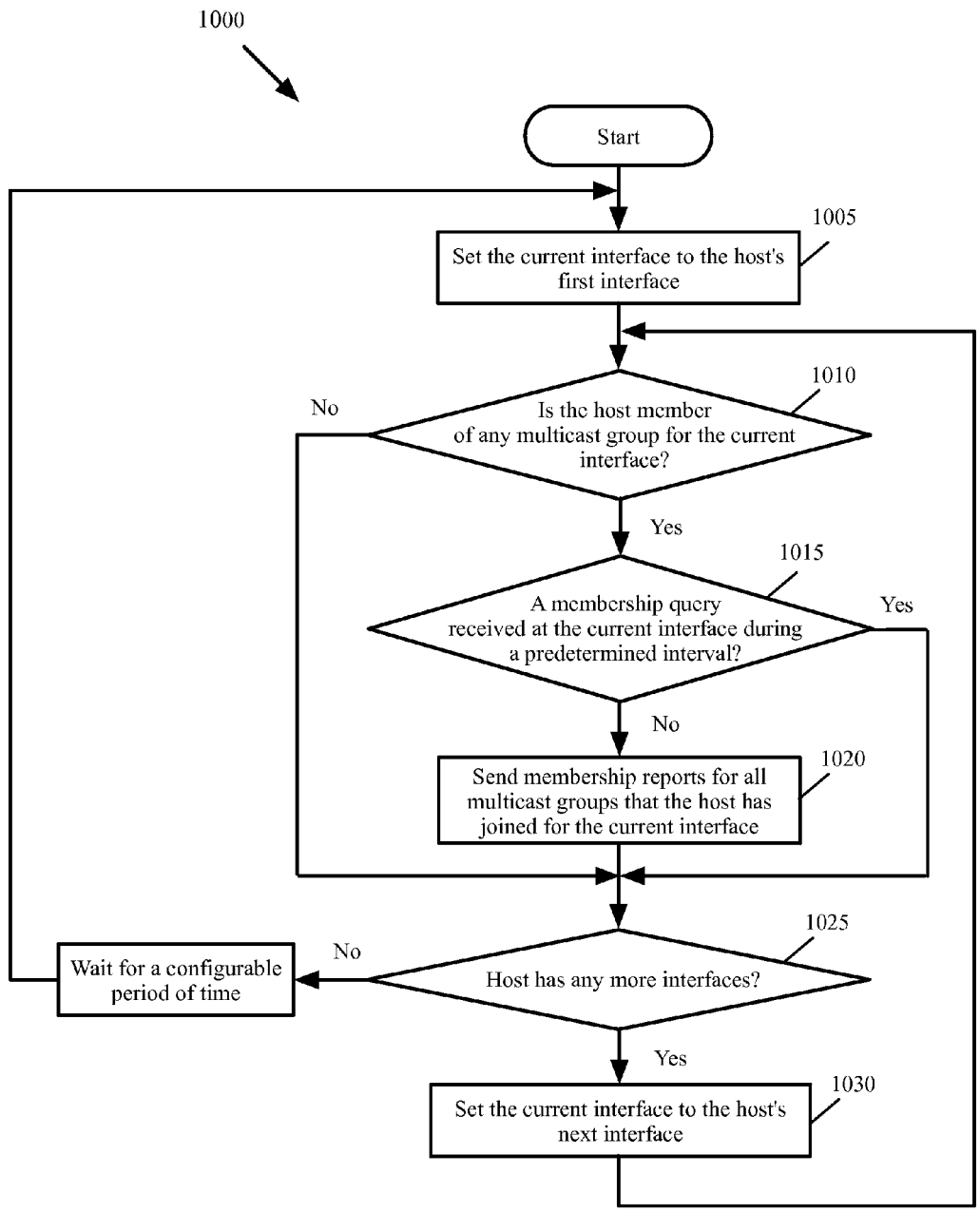
FIG. 10 conceptually illustrates a process that a host performs in some embodiments of the invention to prevent the host's multicast memberships to expire at an external switch.

FIG. 10 conceptually illustrates a process 1000 that a host performs in some embodiments of the invention to prevent the host's multicast memberships to expire at an external switch. As shown, the process sets (at 1005) the current interface to the host's first interface. For instance, if the host is connected to n different switches through n different ports, the process sets the current interface to the interface connected to port 1.

The process then determines (at 1010) whether the host is member of (i.e., whether the host has previously joined) any multicast groups for the current interface. If not, the process proceeds to 1025, which is described further below. Otherwise, the process determines (at 1015) whether a membership query is received at the current interface during a predetermined/configurable interval. As described by reference to FIG. 8 above, the predetermined/configurable period depends on the time out period after which the snooping device removes a group address from a port's group address table. If yes, the process proceeds to 1025, which is described below.

Otherwise, the process sends (at 1020) multicast reports packets for all multicast groups that the host has joined for the current interface. The host sends these packets without receiving any triggering membership query packets. The process then determines (at 1025) whether the host has any more interfaces. If yes, the process sets (at 1030) the current interface to the host's next interface. The process then proceeds to 1010, which was described below. Otherwise, the process waits (at 1035) for a configurable period of time (which is equal to less than a multicast query period). The process then proceeds to 1005, which was described above.

II. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 11:
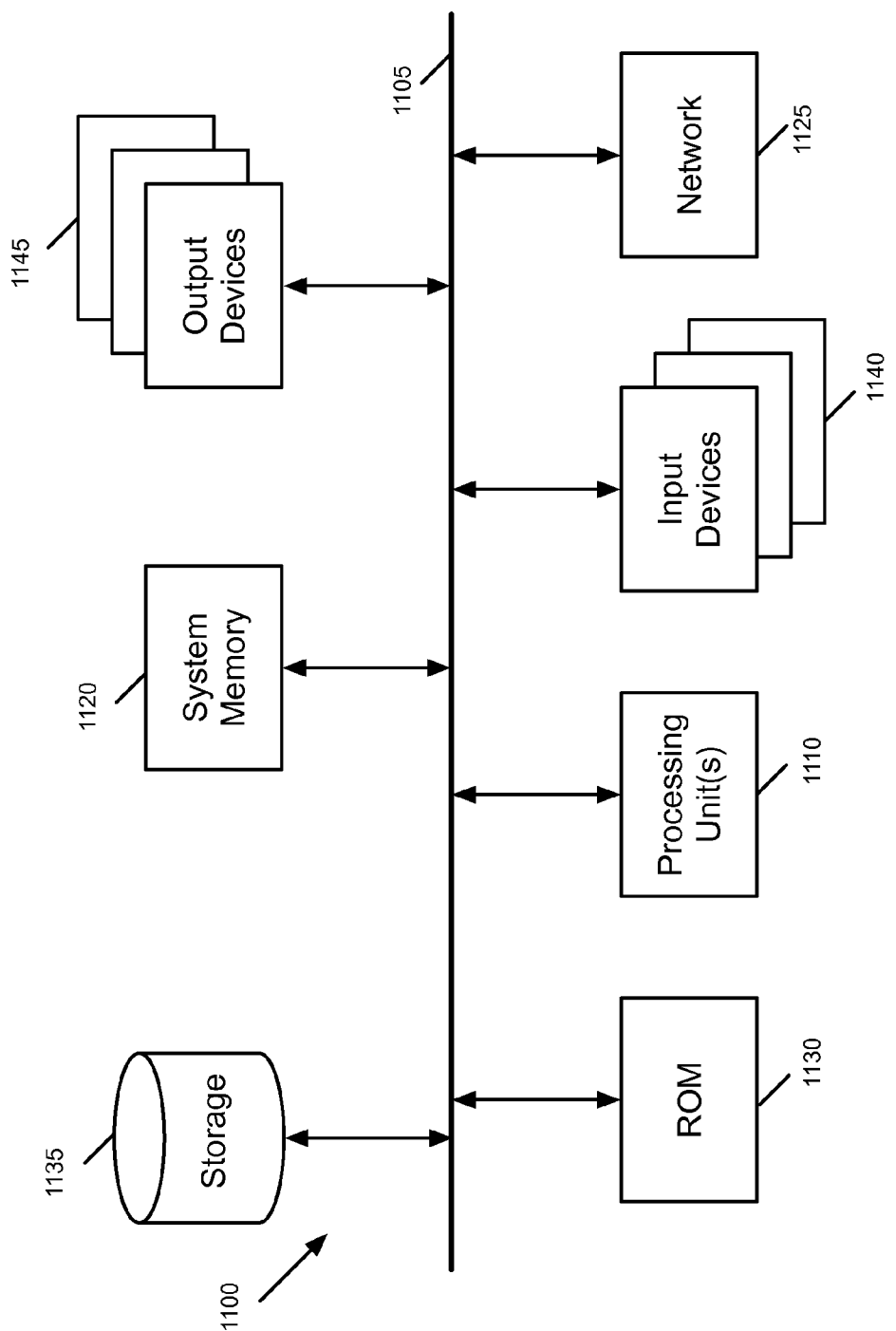
FIG. 11 conceptually illustrates an electronic system with which some embodiments of the invention are implemented.

FIG. 11 conceptually illustrates an electronic system 1100 with which some embodiments of the invention are implemented. The electronic system 1100 can be used to execute any of the control, virtualization, or operating system applications described above. The electronic system 1100 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1100 includes a bus 1105, processing unit(s) 1110, a system memory 1120, a read-only memory (ROM) 1130, a permanent storage device 1135, input devices 1140, and output devices 1145.

The bus 1105 collectively represents all system, peripheral, and chipset buses that communicatively connect the numerous internal devices of the electronic system 1100. For instance, the bus 1105 communicatively connects the processing unit(s) 1110 with the read-only memory 1130, the system memory 1120, and the permanent storage device 1135.

From these various memory units, the processing unit(s) 1110 retrieve instructions to execute and data to process in order to execute the processes of the invention. The processing unit(s) may be a single processor or a multi-core processor in different embodiments.

The read-only-memory 1130 stores static data and instructions that are needed by the processing unit(s) 1110 and other modules of the electronic system. The permanent storage device 1135, on the other hand, is a read-and-write memory device. This device is a non-volatile memory unit that stores instructions and data even when the electronic system 1100 is off. Some embodiments of the invention use a mass-storage device (such as a magnetic or optical disk and its corresponding disk drive) as the permanent storage device 1135.

Other embodiments use a removable storage device (such as a floppy disk, flash drive, etc.) as the permanent storage device. Like the permanent storage device 1135, the system memory 1120 is a read-and-write memory device. However, unlike storage device 1135, the system memory is a volatile read-and-write memory, such a random access memory. The system memory stores some of the instructions and data that the processor needs at runtime. In some embodiments, the invention's processes are stored in the system memory 1120, the permanent storage device 1135, and/or the read-only memory 1130. From these various memory units, the processing unit(s) 1110 retrieve instructions to execute and data to process in order to execute the processes of some embodiments.

The bus 1105 also connects to the input and output devices 1140 and 1145. The input devices enable the user to communicate information and select commands to the electronic system. The input devices 1140 include alphanumeric keyboards and pointing devices (also called "cursor control devices"). The output devices 1145 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 11, bus 1105 also couples electronic system 1100 to a network 1125 through a network adapter (not shown). In this manner, the computer can be a part of a network of computers (such as a local area network ("LAN"), a wide area network ("WAN"), or an Intranet, or a network of networks, such as the Internet. Any or all components of electronic system 1100 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. In addition, a number of the figures (including FIGS. 7 and 10) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

This specification refers throughout to computational and network environments that include virtual machines (VMs). However, virtual machines are merely one example of data compute nodes (DNCs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

One of ordinary skill in the art will recognize that while the specification refers to VMs, the examples given could be any type of DCNs, including physical hosts, VMs, non-VM containers, and hypervisor kernel network interface modules. In fact, the example networks could include combinations of different types of DCNs in some embodiments.

In view of the foregoing, one of ordinary skill in the art would understand that the invention is not to be limited by the foregoing illustrative details, but rather is to be defined by the appended claims.

What is claimed is:

1. A method of submitting multicast membership packets in a network comprising a plurality of hosts and a switching device comprising a set of ports, the switching device maintaining a multicast group table for each port to identify a set of multicast group addresses that at least one host connected to the port has joined, the method comprising:
   from a first host connected to a first port of the switching device, sending a multicast packet to a first multicast group address to join the first multicast group address;
   at the first host, determining that a multicast membership query has not been received by the first host for a particular period of time, the particular period of time determined based on a time out period the switching device uses to remove the first multicast group address from the first port multicast group table when a multicast report packet addressed to the first multicast group is not received at the first port during the time out period; and
   sending a multicast report packet from the first host to the first multicast group address without receiving a multicast membership query based on the determination that a multicast membership query has not been received by the first host for the particular period of time.

2. The method of claim 1, wherein the network further comprises a querier device for sending the multicast membership queries.

3. The method of claim 1, wherein the particular period of time is less than or equal to said time out period.

4. The method of claim 1 further comprising sending a multicast report packet from the first host to the first multicast group address at rejoin time intervals while no multicast membership queries are received at the first host, wherein the join time interval is less than or equal to said timeout period.

5. The method of claim 1 further comprising:
receiving a multicast membership query at the first host;
sending a multicast report packet from the first host to the first multicast group address in response to the multicast membership query; and
sending a multicast report packet from the first host to the first multicast group address without receiving a multicast membership query only when a multicast membership query is not received at the first host within said particular period of time.

6. The method of claim 1, wherein the host uses Internet group management protocol (IGMP) for sending and receiving multicast packets.

7. The method of claim 1, wherein the first host has joined a set of multicast group addresses other than the first multicast group address, the method further comprising:
sending a multicast report packet from the first host to each of the set of multicast group addresses without receiving a multicast membership query based on the determination that a multicast membership query has not been received by the first host for the particular period of time.

8. A non-transitory computer readable medium storing a program for submitting multicast membership packets in a network comprising a plurality of hosts and a switching device comprising a set of ports, the switching device maintaining a multicast group table for each port to identify a set of multicast group addresses that at least one host connected to the port has joined, the program executable by a processing unit, the program comprising sets of instructions for:
sending, from a first host connected to a first port of the switching device, a multicast packet to a first multicast group address to join the first multicast group address;
determining, at the first host, that a multicast membership query has not been received by the first host for a particular period of time, the particular period of time determined based on a time out period the switching device uses to remove the first multicast group address from the first port multicast group table when a multicast report packet addressed to the first multicast group is not received at the first port during the time out period; and
sending a multicast report packet from the first host to the first multicast group address without receiving a multicast membership query based on the determination that a multicast membership query has not been received by the first host for the particular period of time.

9. The non-transitory computer readable medium of claim 8, wherein the network further comprises a querier device for sending the multicast membership queries.

10. The non-transitory computer readable medium of claim 8, wherein the particular period of time is less than or equal to said time out period.

11. The non-transitory computer readable medium of claim 8, the program further comprising a set of instructions for sending a multicast report packet from the first host to the first multicast group address at rejoin time intervals while no multicast membership queries are received at the first host, wherein the join time interval is less than or equal to said timeout period.

12. The non-transitory computer readable medium of claim 8, the program further comprising sets of instructions for:
receiving a multicast membership query at the first host;
sending a multicast report packet from the first host to the first multicast group address in response to the multicast membership query; and
sending a multicast report packet from the first host to the first multicast group address without receiving a multicast membership query only when a multicast membership query is not received at the first host within said particular period of time.

13. The non-transitory computer readable medium of claim 8, wherein the host uses Internet group management protocol (IGMP) for sending and receiving multicast packets.

14. The non-transitory computer readable medium of claim 8, the program further comprising sets of instructions for:
sending from the first host, one or more multicast packets to a set of multicast group addresses other than the first multicast group address to join the set of multicast group addresses; and
sending a multicast report packet from the first host to each of the set of multicast group addresses without receiving a multicast membership query based on the determination that a multicast membership query has not been received by the first host for the particular period of time.

15. A network host device operating in a network comprising a plurality of network host devices and a switching device comprising a set of ports, the switching device maintaining a multicast group table for each port to identify a set of multicast group addresses that at least one network host device connected to the port has joined, the network host device connected to a first port of the switching device, the network host device configured to:
send a multicast packet to a first multicast group address to join the first multicast group address;
determine that a multicast membership query has not been received by the first host for a particular period of time, the particular period of time determined based on a time out period the switching device uses to remove the first multicast group address from the first port multicast group table when a multicast report packet addressed to the first multicast group is not received at the first port during the time out period; and
send a multicast report packet from the first host to the first multicast group address without receiving a multicast membership query based on the determination that a multicast membership query has not been received by the first host for the particular period of time.

16. The network host device of claim 15, wherein the network further comprises a querier device for sending the multicast membership queries, wherein the network host device is configured to receive said multicast membership queries from the querier device.

17. The network host device of claim 15, wherein the particular period of time is less than or equal to said time out period.

18. The network host device of claim 15 further configured to a multicast report packet from the first host to the first multicast group address at rejoin time intervals while no multicast membership queries are received at the first host, wherein the join time interval is less than or equal to said timeout period.

19. The network host device of claim 15 further configured to:
- receive a multicast membership query at the first host;
- send a multicast report packet from the first host to the first multicast group address in response to the multicast membership query; and
- send a multicast report packet from the first host to the first multicast group address without receiving a multicast membership query only when a multicast membership query is not received at the first host within said particular period of time.

20. The network host device of claim 15, wherein the network host device uses Internet group management protocol (IGMP) for sending and receiving multicast packets.

21. The network host device of claim 15 further configured to:
- send from the first host, one or more multicast packets to a set of multicast group addresses other than the first multicast group address to join the set of multicast group addresses; and
- send a multicast report packet from the first host to each of the set of multicast group addresses without receiving a multicast membership query based on the determination that a multicast membership query has not been received by the first host for the particular period of time.

* * * * *